March 18, 1969

A. G. AUGUNAS 3,433,525

VEHICLE SUNSHADE FASTENING MEANS

Filed Jan. 31, 1967

INVENTOR.

BY Algis G. Augunas

David A. Greenlee

ATTORNEY

United States Patent Office

3,433,525
Patented Mar. 18, 1969

3,433,525
VEHICLE SUNSHADE FASTENING MEANS
Algis G. Augunas, Royal Oak, Mich., assignor to General Motors Corporation, Detroit, Mich., a corporation of Delaware
Filed Jan. 31, 1967, Ser. No. 613,030
U.S. Cl. 296—97  3 Claims
Int. Cl. B60j 3/02

ABSTRACT OF THE DISCLOSURE

A sunshade is pivotally mounted at one end of the vehicle header. The other, or free end, of the sunshade is provided with a fastening element including a plurality of flexible loops. A header-mounted fastening element includes a plurality of flexible hooks which are engageable with the loops to secure the free end to the header. A force applied to the free end deforms the hooks sufficiently to disengage the loops and hooks and free the sunshade for movement relative to the header about its pivoted end.

---

Many vehicles are provided with means for fastening the free ends of the sunshades to the windshield header to prevent inadvertent horizontal swinging movement during vertical adjustment. These fastening means usually comprise pockets in a header-mounted rear view support bracket for retaining the extensions or tips on the free ends of the sunshades. To unfasten a sunshade for horizontal swinging movement, the sunshade must first be moved upwardly to extract the tip from a pocket, then moved downwardly, and then moved to the desired position. To again fasten the sunshade, this procedure must be reversed.

This invention provides improved means for fastening the free end of a sunshade to the header which simplifies the fastening and unfastening procedure and yet securely fastens the sunshade free end to prevent inadvertent horizontal movement during vertical adjustment.

One feature of this invention is that a first fastening element is mounted on the windshield header or support structure and a second fastening element is mounted on the sunshade free end, one of the elements comprising a plurality of flexible loops and the other of the elements comprising a plurality of flexible hooks, the hooks being engageable with the loops to fasten the sunshade to the header and being separable therefrom by movement of the sunshade away from the header.

Another feature is that the sunshade fastening element is rotatably mounted on the sunshade support arm to permit vertical adjustment of the sunshade without disengaging the fastening elements.

Yet another feature is that the header fastening element is a flat strip mounted on the header, thereby permitting disengagement of the sunshade free end from the header by movement of the sunshade away from the header in any direction.

These and other features of this invention will become readily apparent upon reference to the following detailed description of the attached drawings in which.

Figure 1:
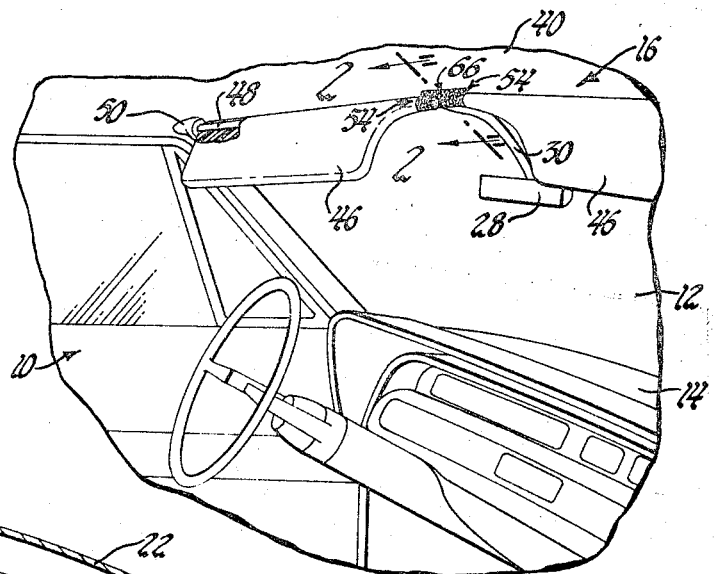
FIGURE 1 is a partial perspective view of the front portion of a vehicle passenger compartment having sunshades which are fastened to the header at their free ends by fastening means according to this invention.
Figure 2:
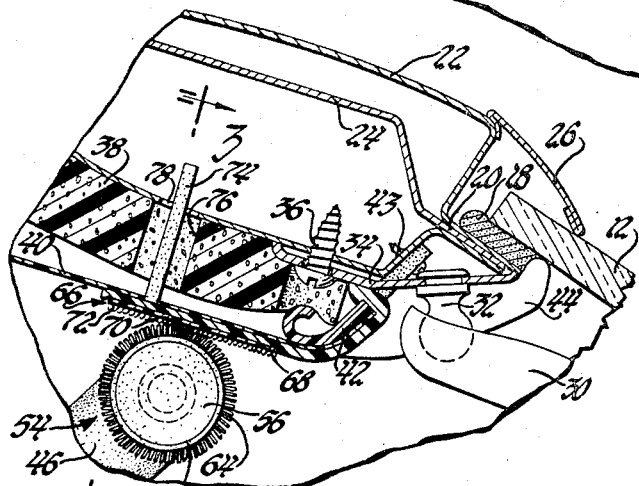
FIGURE 2 is an enlarged sectional view taken generally on the plane indicated by line 2—2 of FIGURE 1.

Referring now to FIGURES 1 and 2 of the drawings, a conventional vehicle body 10 includes a windshield 12 which extends upwardly from an instrument panel 14 to the roof 16. The windshield 12 is cemented at 18 to a pinch weld 20 interconnecting a roof outer panel 22 and a windshield header 24. A reveal molding 26 extends between windshield 12 and outer roof panel 22 exteriorly of the vehicle and is conventionally attached thereto by means not shown.

A rear view mirror 28 includes an upwardly extending support arm 30 which is swiveled on a stud 32 of a mounting bracket 34 that is mounted to header 24 by screws 36. A layer of padding 38 is secured to header 24 and covered by a headlining 40. The forward edge of the headlining is secured to a flexible plastic strip 42 which seats on the forward edge of the padding 38 and also on a flange of header 24 and is screw-attached at 43 to the latter. Strip 42 is notched so as to clear bracket 34. Garnish moldings 44 are provided to each side of the bracket 34 and are conventionally attached to the header 24.

A pair of like conventional padded sunshades 46 are provided for the vehicle occupants. Since the sunshades 46 are identical, only one will be particularly described.

The outer end of the sunshade support arm 48 is conventionally mounted at 50 to the header 24 to permit adjustment of the sunshade about horizontal and vertical axes. Reference may be had to 3,214,125, Pyuro for the details of the mounting means 50.

Fastening means according to this invention are provided for releasably fastening the inner end of the sunshade to the header 24 to prevent inadvertent horizontal movement of the sunshade during vertical adjustment by the vehicle occupants.

Figure 3:
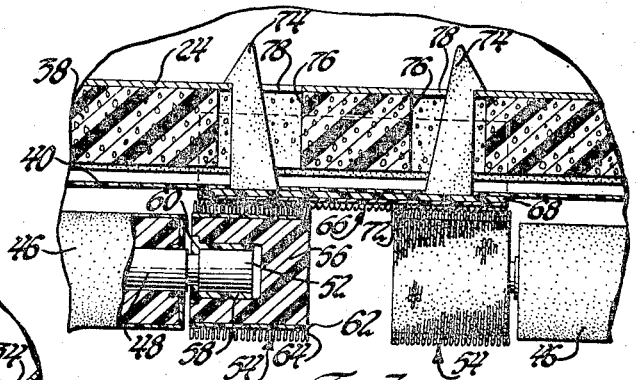
FIGURE 3 is a sectional view taken generally on the plane indicated by line 3—3 of FIGURE 2.

As shown in FIGURE 3, the inner end 52 of support arm 48 rotatably mounts a fastening element 54. Element 54 includes a cylindrical roller 56 provided with a bore which receives a self-lubricating plastic bearing 58. A flange 60 of the bearing is received within an annular groove of the support arm to rotatably retain roller 56 on the support arm. The roller 56 is made of polyurethane or similar foam material and has its outer surface covered by a strip of plastic or nylon material 62 having a plurality of flexible plastic or nylon loops or pile 64 extending therefrom.

A header fastening element 66 includes a flexible flat or planar plastic base 68 mounting a strip of plastic or nylon material 70 having a plurality of flexible plastic or nylon hooks 72 extending from its surface. The forward portion of base 68 is located between moldings 44 and has a hooked edge clamped between bracket 34 and the base of the notch in the strip 42. A pair of integral flexible hook fingers 74 extend from the rearward portion of base 68 through slots in the headlining, slots 76 in the padding 38, and apertures 78 in the header 24 and have their hook ends engaging the inner surface of the header to retain the rearward portion on the header.

The engagement of a plurality of hooks 72 of the fastening element 66 with a plurality of the loops 64 of the fastening element 54 releasably retains the sunshade on the header. The rotatable mounting of element 54 on the support arm prevents inadvertent disengagement of the sunshade from the header upon vertical adjustment of the sunshade. The sunshade may be detached for horizontal movement by applying a force to the sunshade in the direction of desired movement. This force will cause loops 64 to deform the flexible hooks 72 sufficiently to disengage element 54 from element 66 and release the sunshade from the header and permit pivotal movement about mounting means 50. When it is again desired to attach the sunshade to the header, element 54 is pressed against element 66 to re-engage loops 64 with hooks 72.

Another embodiment of this invention is shown in

Figure 4:
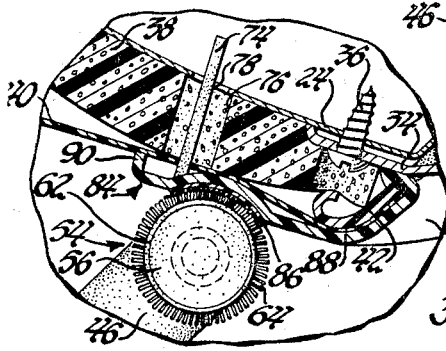
FIGURE 4 is a view similar to FIGURE 2 showing another embodiment of the sunshade fastening means.

FIGURE 4, wherein elements identical to those previously described are denoted by like numerals. In this embodiment the header fastening element 84 is similar to element 66, except that a transverse semicylindrical depression 86 is provided in base 88 to additionally positively locate element 54 in relation to the header. Base 88 is provided with a flanged rear edge 90 in engagement with the headlining to space the base with respect thereto. This embodiment is identical in operation to the embodiment shown in FIGURES 2 and 3.

While only two embodiments of this invention have been shown and described, other modifications are obvious and are contemplated within the scope of this invention.

I claim:

1. In combination with a vehicle having a sunshade mounted at one end thereof on a body support for selective adjustment about substantially horizontal and vertical axes, fastening means for selectively fastening the free end of the sunshade to the support comprising: a first fastening element, means mounting the first fastening element on the support, a second fastening element, means rotatably mounting the second fastening element on the free end of the sunshade, one fastening element including a plurality of flexible hooks extending therefrom, the other fastening element including a plurality of flexible loops extending therefrom, the first and second elements being operable to fasten the sunshade free end to the support upon engagement of the hooks with the loops for selective rotation of the sunshade about the substantially horizontal axis relative to the support, the first and second elements being separable by movement of the sunshade about the substantially vertical axis.

2. Fastening means as recited in claim 1, wherein the first mounting means includes a base portion having a generally planar configuration with a semi-cylindrical depression, and the rotatable mounting means includes a generally cylindrical sleeve mating with the base portion depression, to positively locate the sunshade with respect to the support upon engagement of the first and second fastening means.

3. Fastening means as recited in claim 1, wherein the first mounting means includes a base portion having a generally planar configuration and the rotatable mounting means includes a generally cylindrical sleeve tangentially engageable with the base portion at a number of engagement positions of the first and second fastening elements to obtain selective adjustment of the sunshade about the substantially vertical axis.

References Cited

UNITED STATES PATENTS

| | | | |
|---|---|---|---|
| 2,802,693 | 8/1957 | Lauve | 296—97 |
| 3,228,722 | 1/1966 | Clare | 296—97 |
| 3,321,068 | 5/1967 | Beach | 248—205 |

LEO FRAGLIA, *Primary Examiner.*

L. DANIEL MORRIS, JR., *Assistant Examiner.*